Figure 1:
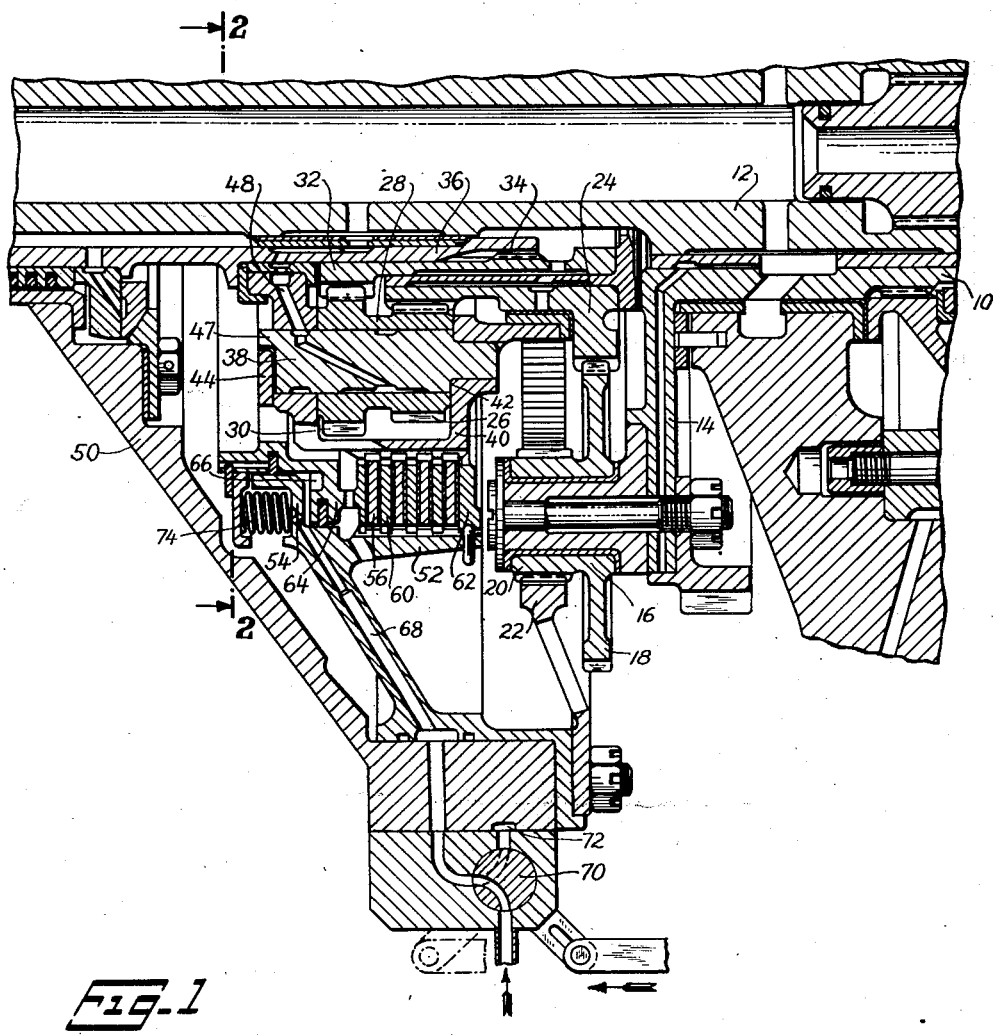

Feb. 6, 1945.   H. C. HILL ET AL   2,368,835
TRANSMISSION
Filed Oct. 6, 1942   4 Sheets-Sheet 1

INVENTORS
HENRY C. HILL
HERMAN D. JACKES
FRANK M. KINCAID, JR.
BY
ATTORNEY

Feb. 6, 1945.   H. C. HILL ET AL   2,368,835
TRANSMISSION
Filed Oct. 6, 1942   4 Sheets-Sheet 2

INVENTORS
HENRY C. HILL.
HERMAN D. JACKES,
FRANK M. KINCAID, JR.
BY
ATTORNEY

Feb. 6, 1945.   H. C. HILL ET AL   2,368,835
TRANSMISSION
Filed Oct. 6, 1942   4 Sheets-Sheet 4

INVENTORS
HENRY C. HILL
HERMAN D. JACKES.
FRANK M. KINCAID, JR.
BY
ATTORNEY

Patented Feb. 6, 1945

2,368,835

UNITED STATES PATENT OFFICE 2,368,835

TRANSMISSION

Henry C. Hill, Montclair, Herman D. Jackes, Bloomfield, and Frank M. Kincaid, Jr., Mountain Lakes, N. J., assignors to Wright Aeronautical Corporation, a corporation of New York Application October 6, 1942, Serial No. 461,026

13 Claims. (Cl. 74—260)

This invention relates to a new and improved variable gear drive in which a shift from one drive ratio to another is accomplished without any change in the engagement or disengagement of the elements of the drive. The particular showing in the drawings relates to a variable speed drive for engine superchargers, but obviously the invention is of general application.

In certain prior art variable gear devices, in shifting from one gear ratio to another it is necessary to mesh or de-mesh gears or splines in order to effect a shift, so that it is first necessary to bring the coacting gears into speed synchronism. Accordingly, it is an object of this invention to provide a gear drive in which there is no change in the engagement or disengagement of the various gears so that there is no necessity in providing means to bring about speed synchronism between the gears to be shifted. It is recognized that broadly such variable speed drives are old. However, in such variable speed drives of the prior art either a one-way clutch is provided to effect a direct drive when the gear drive is interrupted by a brake or clutch, or an additional clutch or brake is provided to effect the direct drive. Both of these prior art constructions have these disadvantages. The one-way clutch imposes a shock load on the drive when it engages. When two brakes or clutches are provided it is difficult to shift from one speed to another without going through neutral, that is, without interrupting the drive. Accordingly, it is an object of this invention to provide a much simpler variable speed drive so constructed that this one-way clutch or the added brake or clutch and their inherent disadvantages are eliminated.

Briefly, it is an object of this invention to provide a variable gear drive in which a change in the speed drive ratio is effected by the simple application or removal of a braking force to the gear drive. It is a further object of this invention to provide a variable gear drive in which there is no meshing or de-meshing of the gears during the shifting operation, and during normal operation of the drive there are no frictional losses except for the usual bearing and gear teeth losses.

Specifically, applicants' invention consists of a planetary gear drive in which a brake means is provided to prevent or permit planetizing action of the planet pinion gears whereby when said brake means is applied a gear drive is provided through said pinions, and when said brake means is released the pinions planetize at such speed that the centrifugal force acting on said pinions produces a sufficient bearing pressure to frictionally lock the pinions from rotation about their journals thereby providing a direct drive connection.

Figure 2:
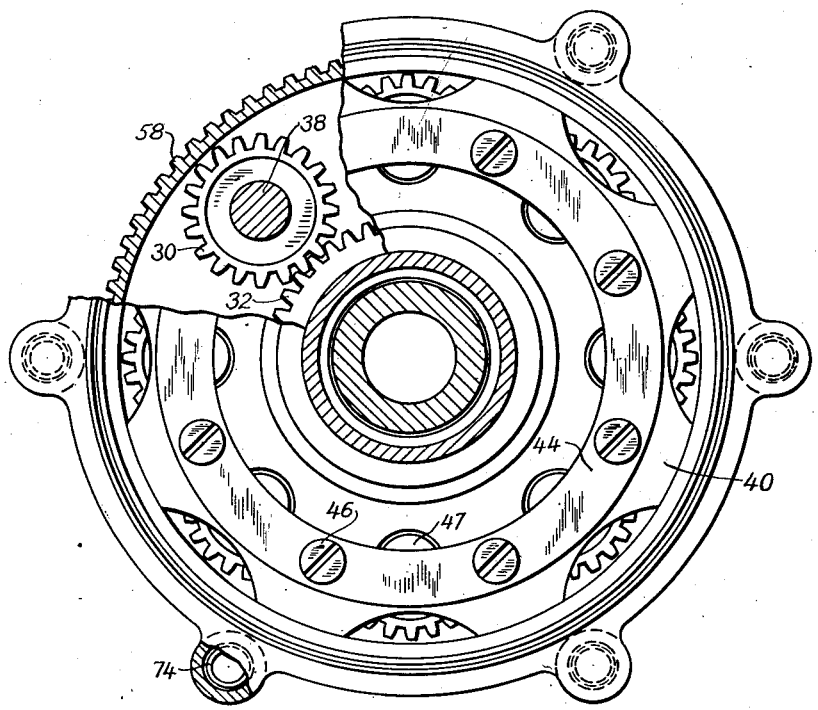
Figure 3:
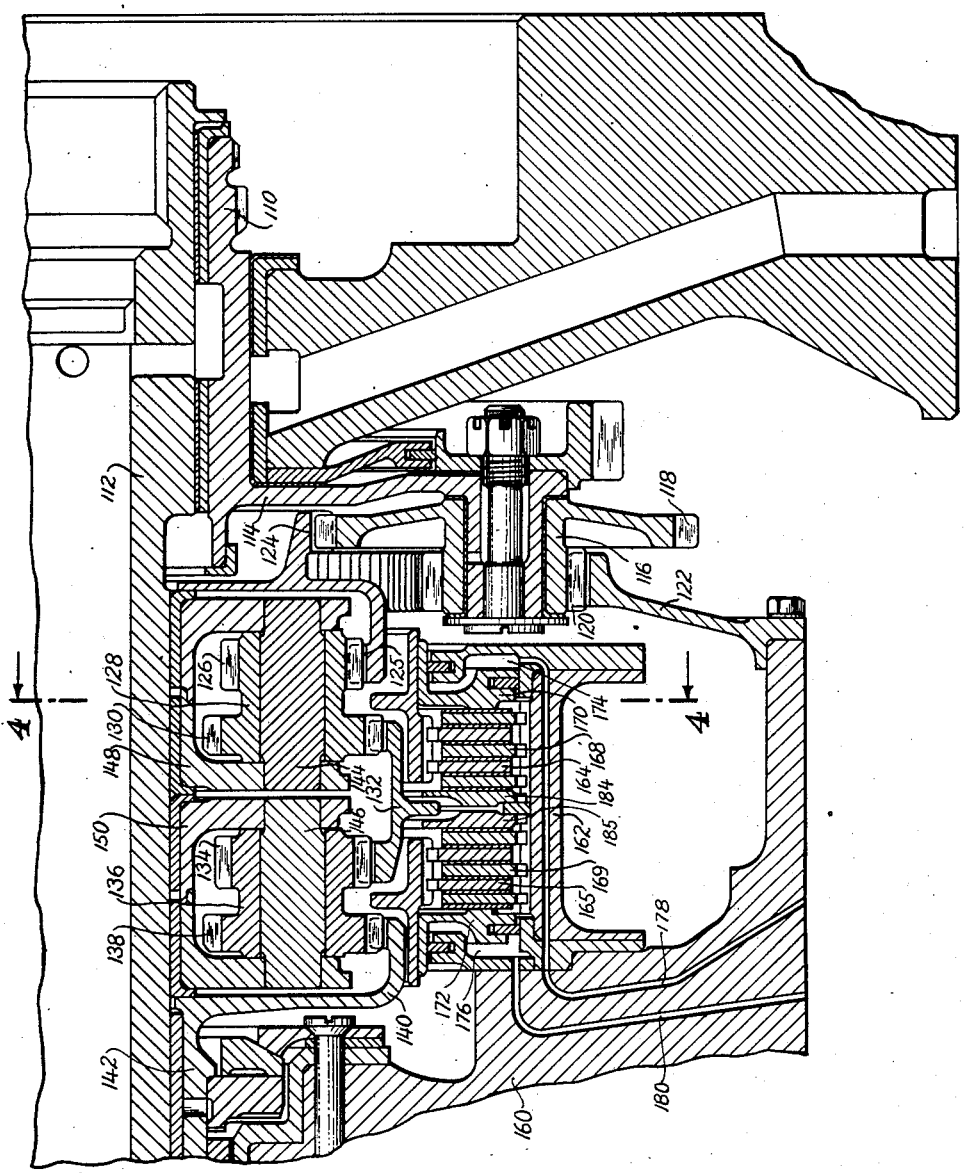
Figure 4:
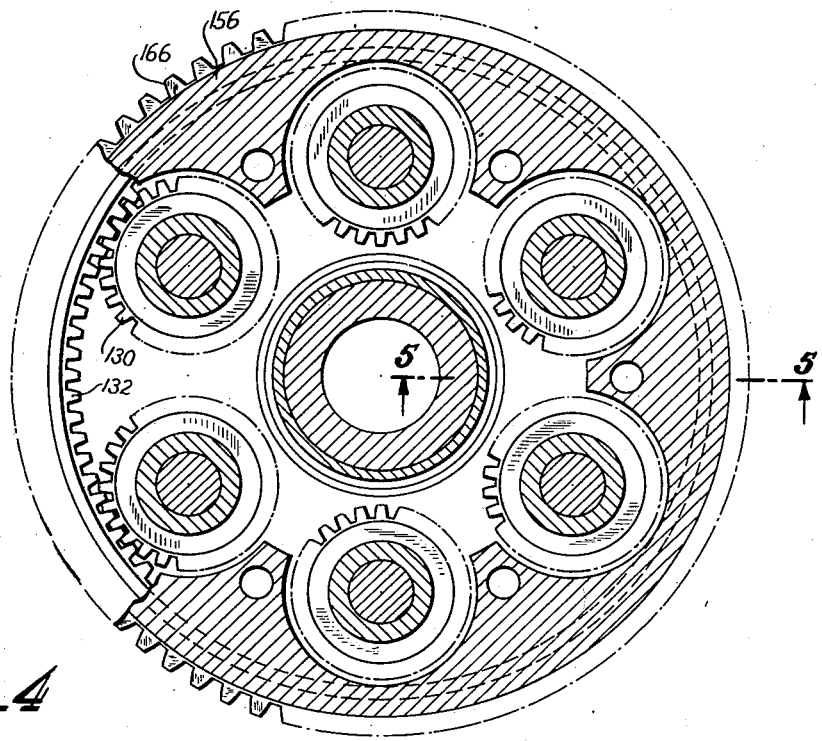
Figure 5:
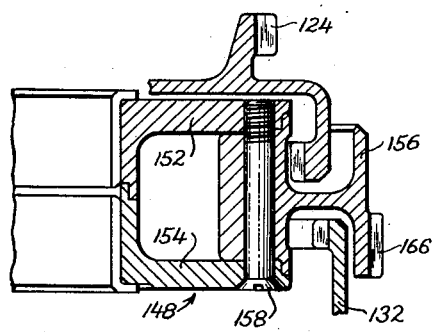

Further objects of this invention will become apparent in reading the annexed detailed description in connection with the drawings, in which:

Fig. 1 is a sectional view of the invention;
Fig. 2 is a section on the line 2—2 of Fig. 1;
Fig. 3 is a sectional view of a modification;
Fig. 4 is a section on the line 4—4 of Fig. 3; and
Fig. 5 is a section on the line 5—5 of Fig. 4.

Referring to Figs. 1 and 2, a shaft 10 is driven from the engine tailshaft 12 through a connection, not shown, and a radially extending planet pinion-carrying spider 14 is formed integral with the shaft 10. A plurality of double pinions 16 are carried by the spider 14. These double pinions comprise integral coaxial gears 18 and 20 of which gear 20 is meshed with fixed reaction gear 22, and gear 18 is meshed with one end of a compound annular gear 24. The double pinions 16 thereby provide a step-up drive ratio between shaft 10 and gear 24. The structure so far described is conventional and forms no part of the invention hereinafter described.

The other end of annular gear 24 is meshed with a plurality of pinion gears 26 each of which constitutes one gear of a double pinion 28. The other gear 30 of each of these double pinions is integral and coaxial with the gear 26 and is meshed with a gear 32 splined at 34 to the output or supercharger impeller shaft 36. The double pinions 28 are each journalled about a shaft 38 and these shafts are secured within a cage element 40. The shafts 38 are inserted through one side of the cage element, and a shoulder 42 formed on these shafts cooperates with the other side of the cage to act as a stop. A ring 44, secured to the first mentioned side of the cage element by bolts 46, extends over the ends of the shafts 38 to hold them in place with their shoulders 42 in abutting engagement with the opposite side of the cage. A lip 47 formed on each shaft cooperates with the ring 44 to prevent rotation of the shafts about their axes, and passages 48 provide for flow of lubricating oil under pressure to the bearing surfaces of the double pinions 28 on their journals.

An engine housing portion 50 is provided with an annular axial extension 52 which surrounds the cage element 40, and with a radial extension 54. Annular clutch plates 56 are splined to the exterior of the cage element 40, as at 58, between the cage element and housing extension 52. Intermediate these plates are inner annular plates 60 splined to the extension 52, and an annular end plate 62, secured to the housing, acts as a stop for the clutch plates. An annular piston element 64 is formed about the radial extension 54 to form an annular chamber 66 therebetween. A passage 68 connects this annular chamber to a source of fluid pressure, as for example, the engine lubricating oil system, through a valve 70. When this valve is in open position, as illustrated by the full lines in Fig. 1, fluid is admitted to the chamber 66 behind the annular piston 64. The piston is thereby forced to the right to frictionally clamp the clutch plates together thereby locking the cage element 40 in position. When the control valve 70 is closed, as shown by its dotted line position in Fig. 1, fluid is permitted to drain from the annular chamber 66 into drain passage 72 to release the clutch plates, thereby permitting rotation of the cage element 40. A plurality of spring means 74 may be provided to help separate the clutch plates when the fluid pressure is thus shut off.

When clutch plates 56 and 60 are clamped together, the annular cage element 40 and associated journals 38 for the double pinions 28 are held fixed relative to the engine frame to thereby provide a step-up drive from the input gear 24 to the output gear 32 through the double pinions 28. When the fluid pressure in annular chamber 66 is relieved, the clutch plates 56 and 60 no longer act as a friction brake to prevent rotation of the cage element 40. Then with any load at all on the output gear 32, the cage element and its associated pinions would normally be expected to simply planetize about this output gear. However, if the input gear 24 is rotated at a sufficiently high speed, then the centrifugal force resulting from the high speed rotation of the cage element, will be sufficiently large to cause high bearing loads between the double pinions 28 and their journals to thereby produce a sufficient frictional force between said pinions and journals to prevent rotation of these double pinions about their journals. With double pinions 28 thus locked about their journals 38, a direct one-to-one drive is provided between input gear 24 and output gear 32. In other words, when the clutch plates 56 and 60 are released, the speed of the output gear 32 and shaft 36 decreases and the pinion cage element 40 gradually accelerates until they all rotate at the same speed as the input gear. The double pinions then lock the cage in this position to in effect provide a direct spline connection between the input and output gears 24 and 32. If there is any slip between the double pinions 28 and their bearings, the output gear 32 will slip or slow down below the speed of the input gear 24, and the cage speed will increase so that the centrifugal force and the resulting frictional force acting on the pinion bearings will increase, and simultaneously the torque tending to slip the cage will decrease. In fact, with any slip, the pressure on the pinion bearings will increase as the square of the speed of the cage and the torque tendency to slip the cage will decrease as the square of the speed of the output gear. Also, before there can be any slip, the direction of rotation of the pinion gears about their axes must reverse from their direction of rotation during the high speed drive. In other words, when brake plates 56 and 60 are released before the speed of the output gear 32 can slip below the speed of the input gear, the pinion gears must pass through a static condition relative to their axes. In view of these considerations, when the brake plates 56 and 60 are released, the system is inherently stable in the low speed, direct drive condition. It should also be noted that in addition to the friction induced by the centrifugal force, gear tooth friction will also help to lock the pinions. However, this latter factor is negligible, particularly at high engine speeds, as compared to the effect of the centrifugal force acting on the pinion.

Summarizing the operation of the variable speed drive, it should be noted that in high speed the cage element 40 is locked in position by the brake or clutch plates 56 and 60 so that the double pinions 28 provide a step-up drive ratio between the input gear 24 and the output gear 32. However, when the cage element is released, this element will immediately begin to planetize as the output gear slows down. Because of the high speed rotation, the centrifugal force acting on each pinion is sufficient to provide bearing loads of such magnitude as to frictionally lock each pinion about its journal thereby providing a direct drive between the input and output gears. The speed of the input shaft necessary to effect this locking action depends on the particular design. Thus, the torque tending to rotate the pinion gears about their axes is a function of driving torque and of the pitch diameters of the gears, while the friction force available for overcoming this pinion turning torque varies with numerous factors. For example, this friction force varies as the weight of the pinions, the number of pinions, the radial distance to the pinion axis, the diameter of the pinion journals, the coefficient of friction between the pinions and their journals, and as the square of the speed of rotation of the cage element.

It should also be noted that in low gear a one-to-one drive ratio is obtained and the whole gearset revolves as a unit with the pinions locked about their journals. That is, in low gear the gearset in effect provides a splined connection between the input and output gears 24 and 32. In high gear the pinion cage element is stationary so that the pinions are not subjected to any centrifugal force. Therefore, in high gear the friction losses are only those normal in any gearset. It is only during the short interval of shifting that any appreciable friction loss occurs. Thus, in shifting from high to low there will be some friction loss in the pinion bearings while in shifting from low to high there will be some friction loss in the clutch brake plates 56 and 60. Therefore, it will be seen that applicants have provided a very simple and highly efficient variable speed drive.

At this point it should be further noted that since the bearings of the double pinions are connected with a source of lubricating oil under pressure, the variable gear drive can be run indefinitely in a slipping condition without any danger of burning up. Thus, at sufficiently low speeds the gear drive could be run at various degrees of slip similar to a fluid coupling, by providing means to vary the amount of pinion friction.

The variable ratio gearset illustrated in Figs. 1 and 2 and as described above provides a two speed drive. It seems obvious that any number of such gearsets could be connected in series to provide any desired number of drive ratios. Thus, in Figs. 3 to 5 two such gearsets are connected in series so as to provide either a three or a four-speed drive depending on whether the same or a different drive ratio, respectively, is available from each gearset. Also, in the modification illustrated in Figs. 3 to 5, internal gears instead of external gears are meshed with the double pinions of the variable speed gearset. With internal gears less friction torque is necessary for locking the pinions. A shaft 110 is driven from an engine tailshaft 112 through a connection, not shown, and an annular planet pinion-carrying spider 114 is formed integral with the shaft 110. A plurality of double pinions 116 are carried by the annular spider 114. These double pinions comprise integral coaxial gears 118, 120, of which gear 120 is meshed with a fixed internal gear 122, and gear 118 is meshed with a compound annular gear 124. As pointed out in connection with Figs. 1 and 2, this structure is conventional and forms no part of the invention.

The other end of compound gear 124 is formed with internal gear teeth 125 engaging a plurality of pinion gears 126 each of which constitutes one gear of a double pinion 128. The other gear 130 of each double pinion 128 is integral and coaxial with the gear 126 and is meshed with a compound internal gear 132. The other end of gear 132 is also formed as an internal gear and engages a plurality of pinion gears 134 each of which constitutes one gear over a double pinion 136. The other gear 138 of each double pinion 136 is integral and coaxial with the gear 134 and is meshed with an internal gear 140 carried by the output or supercharger impeller shaft 142. Journals 144 and 146 are provided for each of the double pinions 128 and 136, respectively, and these journals are carried by annular cage members 148 and 150, respectively. For purposes of assembly, each cage member is formed in three sections 152, 154 and 156, secured together by bolts 158 as best seen in Fig. 5.

An engine housing portion 160 is provided with an annular axial extension 162 surrounding the cage members 148 and 150. Annular clutch plates 164 and 165 extend between the cage members 148 and 150 and the engine frame extension 162 and are splined to the cage member portions 156 as at 166. Intermediate these plates 164 and 165 are inner clutch plates 168 and 169, respectively, splined to the engine housing extension 162. Annular piston members 170 and 172 are mounted about the engine housing extension 162 to form annular chambers 174 and 176, respectively. Fluid passages 178 and 180 are provided to connect said chambers 174 and 176, respectively, either with a source of fluid pressure or to a drain passage. A valve similar to valve 70 of Fig. 1 may be provided in each of the fluid passages 178 and 180 and a unitary control member may be provided to operate both of these valves. Instead of providing a single valve in each of the passages 178 and 180, a single multi-port valve may be provided for connection to both of these passages. Obviously, this valve structure forms no part of the present invention and any suitable valve may be used. The valve structure should provide for each of the following four conditions:

1. Connect chamber 174 with a source of fluid pressure and chamber 176 to a drain passage.
2. Connect chamber 176 to a source of fluid pressure and chamber 174 to a drain passage.
3. Connect both chambers to a source of fluid pressure.
4. Connect both chambers to a drain passage.

Stop plates 185 and 184 are provided so that admission of fluid pressure behind either of the pistons, for example piston 170, merely serves to clamp plates 164 and 168 together without effecting the condition of clutch plates 165 and 169 and vice versa.

The operation of Figs. 3 to 5 is similar to that of Figs. 1 and 2. Clutch or brake plates 164 and 168 are adapted either to permit or to prevent rotation of the cage member 148 to thereby provide two possible speeds for gear 132. Thus, when the cage member 148 rotates at a sufficiently high speed the double pinions 128 become frictionally locked in position about their journals thereby providing a direct drive between gears 124 and 132, and when the clutch plates 164 and 168 lock the cage member, a step-up drive ratio is provided between gears 124 and 132 through the pinion gears 126 and 130. Similarly, depending on whether clutch plates 165 and 169 permit or prevent rotation of the cage member 150, double pinions 136 provide a direct drive from gear 132 to gear 140 or a step-up drive ratio through the pinion gears 134 and 138. Thus, if the gear ratio of each group of double pinions 128 and 136 is different, as illustrated in Fig. 3, then four different gear drive ratios are obtainable, while if the gear ratio of each group of double pinions 128 and 136 is the same, only three different gear drive ratios are obtainable.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a variable ratio gear drive, a driving member, a coaxial driven member, annular means concentrically mounted about said members and carrying a plurality of double pinions circumferentially spaced about said members, each of said double pinions comprising two integral gears each geared to one of said members respectively, and brake means selectively operable to prevent or permit rotation of said annular pinion carrier, said driving member having a speed of rotation such that when said brake means permits rotation of said annular pinion carrier, said pinion carrier rotates at a speed sufficiently high that the centrifugal force on said pinions results in a frictional force between said pinions and their bearings sufficient to prevent rotation of said pinions relative to their bearings.

2. In a variable ratio gear drive, a driving member, a coaxial driven member, means concentric with said members, a double pinion carried by said means comprising two integral gears of different diameter, each in meshing engagement with one of said members respectively, and brake means selectively operable to prevent or permit rotation of said pinion carrying means, whereby when said brake means prevents rotation of said means a gear drive is provided between said members through said double pinion gears, and when said brake means permits rotation of said pinion carrying means said driving member rotates said pinion carrying means at a speed sufficiently high that the centrifugal force on said pinion results in a frictional force between said pinion and its bearing sufficient to prevent rotation of said pinion relative to its bearings thereby providing a direct drive between said members.

3. In a variable ratio gear drive, a driving member, a coaxial driven member, means concentric with said members, one or more double pinions carried by said means, each of said double pinions comprising two integral gears of different diameter each in meshing engagement with one of said members respectively, and brake means selectively operable to prevent or permit rotation of said pinion carrying means, whereby when said brake means prevents rotation of said means, a gear drive is provided between said members through said double pinion gears, said driving member having a speed of rotation such that when said brake means permits rotation of said pinion carrying means, said means rotates at a speed sufficiently high that the centrifugal force on said pinion results in a frictional force between said pinions and their bearings sufficient to overcome the torque tending to cause rotation of said pinions about their bearings.

4. In a variable ratio gear drive, a high speed driving member, a coaxial driven member, annular means concentric with said members and carrying a plurality of double pinions with their axes parallel to said members, each of said double pinions comprising two integral coaxial gears each geared to one of said members respectively, and brake means selectively operable to prevent or permit rotation of said annular pinion carrier, whereby when said brake means prevents rotation of said pinion carrier a gear drive is provided between said members through said double pinion gears, and when said brake means permits rotation of said pinion carrier said driving member rotates said carrier at a sufficiently high speed that the centrifugal force on said pinions results in a frictional force between said pinions and their bearings sufficient to prevent rotation of said pinions relative to their bearings thereby providing a direct drive between said members.

5. In a variable ratio gear drive, a high speed driving member, a coaxial driven member, annular means concentric with said members, a plurality of double pinions carried by said means and having their bearing axes parallel to said members, each of said double pinions comprising two integral coaxial gears each geared to one of said members respectively, and brake means selectively operable to prevent or permit rotation of said element, whereby when said brake means prevents rotation of said annular means a gear drive is provided between said members through said double pinion gears, and when said brake means permits rotation of said annular means, said driving member rotates said carrier at a sufficiently high speed that the centrifugal force on said pinions results in a frictional force between said pinions and their bearings sufficient to restrain rotation of said pinions about their bearings to thereby provide a second drive ratio between said members.

6. In a variable ratio gear drive, a high speed driving member, a coaxial driven member, annular means concentric with said members, a plurality of pinion means carried by said annular means, said pinion means being circumferentially disposed about said members and each geared to both said members, and brake means selectively operable to prevent or permit rotation of said annular means, whereby when said brake means prevents rotation of said annular means a step-up drive ratio is provided between said members through said pinion means, and when said brake means permits rotation of said annular means the centrifugal force acting on said pinion means from rotation of said annular means produces sufficient friction restraining rotation of said pinion means about their bearings to provide a second drive ratio between said members.

7. In a multi-speed transmission, a high speed driving member, a coaxial driven member, a variable gear drive between said members comprising a plurality of double pinions circumferentially disposed about said members and each consisting of two integral coaxial gears having their bearing axes parallel to said members, and selectively operable brake means associated with said pinions, said driving member compelling rotation of said pinions about their bearings when the brake means is applied to provide one drive ratio between said members, and said driving member rotating at such speed that when the brake means is released, said pinions planetize about the axes of said members at a speed sufficiently high that the centrifugal force on said pinions results in a frictional force between their bearings sufficient to lock said pinions against rotation about their bearings thereby to provide a direct drive between said members.

8. In a multi-speed transmission, coaxial driving and driven members, planetary gear means drivably connected between said members and including one or more pinions having their respective axes offset from the axis of said members, and means selectively operable to prevent or permit rotation of said pinions about the axis of said members, said driving member having a speed of rotation such that when said pinions are freed for rotation about the axis of said members, the centrifugal force on said pinions resulting from such rotation produces sufficient friction between said pinions and their bearings to prevent rotation of said pinions relative to their bearings.

9. In a multi-speed transmission, coaxial driving and driven members, planetary gear means drivably connected between said members and including one or more pinions having their respective axes offset from the axis of said members, and means selectively operable to prevent or permit rotation of said pinions about the axis of said members, said driving member having a speed of rotation such that when said pinions are freed for rotation about the axis of said members, the centrifugal force on said pinions resulting from such rotation produces sufficient friction between said pinions and their bearings to prevent rotation of said pinions relative to their bearings, said pinions when prevented from rotating about the axis of said members providing a step-up drive ratio between said members.

10. In a multi-speed transmission, coaxial driving and driven members, planetary gear mechanism drivably connected between said members and including one or more pinions disposed about the axis of said members, said planetary gear mechanism also including means associated with said pinions and capable of rotating about the axis of said members, means selectively operable to prevent or permit rotation of said first-named means about the axis of said members, said driving member having a speed of rotation such that when said first-named means is freed for rotation about the axis of said members, the centrifugal force on said pinions produces sufficient friction between said pinions and their bearings to prevent rotation of said pinions relative to their bearings.

11. In a multi-speed transmission, coaxial driving and driven members, planetary gear mechanism drivably connected between said members including means concentrically disposed relative to said members and pinion means carried thereby about the axis of said members, and means selectively operable to prevent or permit rotation of said carrying means, said pinion means providing a step-up drive ratio between said members when said carrying means is prevented from rotating and when said carrying means is freed for rotation, the centrifugal force on said pinion means resulting from such rotation produces sufficient friction between said pinion means and their bearings to prevent rotation of said pinion means relative to their respective axes to provide a direct drive between said members.

12. In a multi-speed transmission, coaxial driving and driven members, a pair of annular means concentric therewith, pinion means carried by one of said annular members and geared to said driving member and pinion means carried by the other of said annular members and geared to said driven member, said pinion means having their respective axes parallel to and offset from the axis of said driving and driven members, a drive connection from the pinion means on said one annular member to the pinion means on said other annular member, and means selectively operable to prevent or permit rotation of either of said annular members, each of said pinion means providing a step-up drive ratio when its associated annular member is prevented from rotating and when either of said annular members is freed for rotation, the centrifugal force on its associated pinion means resulting from such rotation produces sufficient friction between said pinion means and their bearings to prevent rotation of said pinion means relative to their respective axes.

13. In a multi-speed transmission, co-axial driving and driven members, planetary gear means interposed between said members and including one or more pinions, the axis of each of said pinions being offset from the axis of said members, means selectively operable to prevent or permit rotation of said pinions about the axis of said members for respectively providing a step-up drive ratio or a direct drive ratio between said members, said pinions when freed for rotation about the axis of said members having a transient condition prior to the establishment of said direct drive ratio such that they rotate at progressively increasing speed about the axis of and in the same rotative direction as said members and at the same time said pinions rotate at a progressively decreasing speed about their own respective axes until said pinions attain a static condition relative to their own respective axes, whereupon the centrifugal force caused by rotation of said pinions about the axis of said members is effective to subject said pinions to a force operative to maintain said pinions in said static condition relative to their own respective axes, thereby providing said direct drive ratio.

HENRY C. HILL.
HERMAN D. JACKES.
FRANK M. KINCAID, JR.